United States Patent [19]

Litz et al.

[11] Patent Number: 5,692,853

[45] Date of Patent: Dec. 2, 1997

[54] THREADED JOINT CONSTRUCTION AND ROD ASSEMBLY INCORPORATING SAME

[75] Inventors: Bradley C. Litz, Montville; Gary S. Ruschke, Edison, both of N.J.

[73] Assignee: Curtiss Wright Flight Systems Inc., Fairfield, N.J.

[21] Appl. No.: 562,843

[22] Filed: Nov. 27, 1995

[51] Int. Cl.$^6$ .................................................. F16B 11/00
[52] U.S. Cl. ........................ 403/279; 403/274; 403/296; 29/419.2
[58] Field of Search .................................. 403/284, 285, 403/281, 279, 274, 299, 305, 307, 256, 46, 43, 320; 29/419.2; 72/56

[56] References Cited

U.S. PATENT DOCUMENTS

| | | |
|---|---|---|
| 2,976,907 | 3/1961 | Harvey et al. . |
| 3,134,616 | 5/1964 | Kaufmann ................ 403/296 |
| 3,359,449 | 12/1967 | Trask ...................... 403/296 X |
| 3,434,194 | 3/1969 | Whittaker et al. ............ 72/56 X |
| 3,551,999 | 1/1971 | Gutmann ................. 403/274 X |
| 3,583,052 | 6/1971 | Herbenar et al. ........... 403/43 X |
| 3,729,218 | 4/1973 | Gutmann .................. 403/274 |
| 3,837,755 | 9/1974 | Benoit et al. . |
| 4,097,163 | 6/1978 | Dubuque . |
| 4,513,488 | 4/1985 | Arena . |
| 4,523,872 | 6/1985 | Arena et al. ............... 403/274 |
| 4,561,799 | 12/1985 | Arena . |
| 4,930,204 | 6/1990 | Schurter .................. 29/419.2 |
| 5,304,012 | 4/1994 | Wendling ................. 403/274 |
| 5,619,878 | 4/1997 | Grosjean et al. ............. 72/56 |

*Primary Examiner*—Harry C. Kim
*Attorney, Agent, or Firm*—Klauber & Jackson

[57] ABSTRACT

A threaded joint assembly is provided comprising a first metallic workpiece having an internally threaded cylindrical opening, and a second metallic workpiece having an externally threaded cylindrical surface which is threadingly engaged with the internally threaded opening of the first workpiece. The interthreaded joint between the first and second workpieces are electromagnetically deformed into a permanent interference fit. In consequence of the magneforming process, individual threads at the joint are slightly flattened and squeezed together tip to root to provide a high axial and radial pre-load in the joint. Preferably at least the portions of the first and second workpieces defining the joint are hollow cylinders, and preferably the threads of the joint are tip relieved.

7 Claims, 3 Drawing Sheets

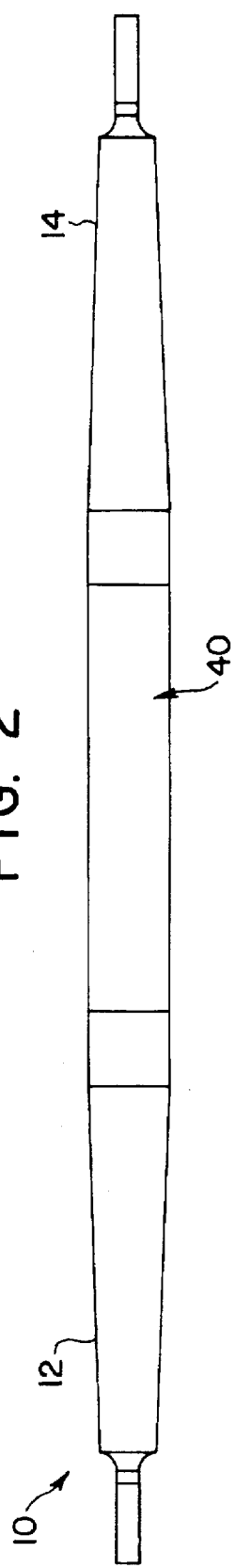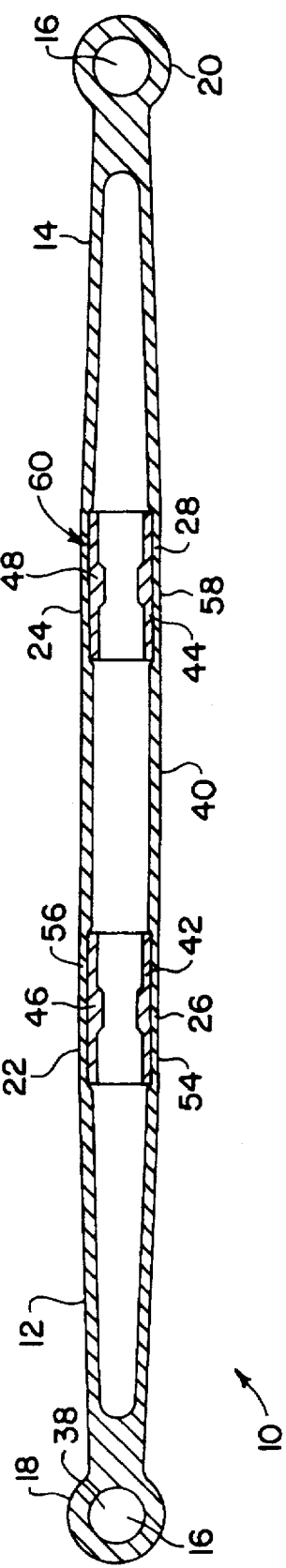

5,692,853

1

THREADED JOINT CONSTRUCTION AND ROD ASSEMBLY INCORPORATING SAME

FIELD OF THE INVENTION

This invention relates generally to a high integrity threaded joint and to the method of forming same. The invention also relates to a rod assembly, such as a push-pull rod, utilizing the said joint.

BACKGROUND OF INVENTION

In numerous industrial applications a requirement exists for attaching tubular parts to mating components. In aircraft and other industries, structural members are thus commonly used to connect or link spaced components, which structural members comprise a hollow lightweight central tube which is attached to end fittings which serve as terminal attachment pieces enabling connection of the components which are to be linked. In the past, a variety of techniques have been used to provide the required joining of the tubular member and end fitting, including riveting and metal deformation techniques. With respect to the latter, swaging and electromagnetic deformation (hereinafter at times referred to as "magneforming") are among the techniques which have been used in the prior art. The use of swaging for such purposes is illustrated, e.g., in U.S. Pat. No. 4,097,163. Similarly, the use of magneforming is illustrated in U.S. Pat. No. 3,837,755, where end members are provided which have a circumferential groove or grooves into which the radially deformed portions of the tubular member fit to effect attachment of the part.

Related disclosures which are particularly applicable to electromagnetic forming of torque joints, may be found in U.S. Pat. Nos. 4,513,488 and 4,561,799.

While joining techniques of the type aforementioned have been successful, a need continues to exist for a high integrity joint which is very lightweight and strong in relation to its size, which may be simply and reliably fabricated, and which can, among other things, be readily incorporated into rod assemblies such as push-pull rods and the like.

SUMMARY OF INVENTION

Now in accordance with a first aspect of the present invention, a threaded joint assembly is provided comprising a first metallic workpiece having an internally threaded cylindrical opening, and a second metallic workpiece having an externally threaded cylindrical surface which is threadingly engaged with the internally threaded opening of the first workpiece; the interthreaded joint between the first and second workpieces being electromagnetically deformed into a permanent interference fit. In consequence of the magneforming process, individual threads at the joint are slightly flattened and squeezed together tip to root to provide a high axial and radial pre-load in the joint. Preferably at least the portions of the first and second workpieces defining the joint are hollow cylinders, and preferably the threads of the joint are tip relieved.

In the method for forming a threaded joint assembly pursuant to the invention, a first metallic workpiece is provided having an internally threaded cylindrical opening. A second metallic workpiece is provided having an externally threaded cylindrical surface, and the externally threaded cylindrical surface of the second workpiece is interthreaded with the internally threaded opening of the first workpiece. The resulting interthreaded joint is then subjected to magneforming to cause the interfitting threads to

2 deform into a permanent interference fit. Preferably at least the portions of the first and second workpieces defining the joint are hollow cylinders. Preferably the threads subjected to magneforming are tip relieved to preclude contact of the mating parts in the root/tip area. The magneforming causes the thread material to flow radially inward, slightly flattening the individual threads and squeezing them together tip to root, to provide a high axial and radial pre-load in the joint.

In a further aspect of the invention the aforementioned joint is incorporated into a structural assembly such as a push-pull rod assembly. Such a push-pull rod assembly comprises first and second metallic end pieces, each terminating in a connector means at the distal end thereof, with the opposed ends being open and internally threaded. A hollow metallic center piece having open internally threaded ends is provided, and first and second metallic coupling pieces. Each coupling piece has externally threaded ends engageable with the internally threaded ends of the first and second end pieces and of the center piece. One each of the coupling pieces is threadingly engaged between an end of the center piece and an opposed open end of one of the said first and second end pieces. The interthreaded joints between the coupling pieces and the thereby coupled center and end pieces are electromagnetically deformed into a permanent interference fit. Individual threads at the joints are slightly flattened and squeezed together tip to root to provide a high axial and radial pre-load in the joint.

In the method for forming the push-pull rod assembly, first and second metallic end pieces are provided, each having a distal connector means and an opposed internally threaded open end. A hollow metallic center piece is provided having opposed internally threaded open ends. The hollow center piece is coupled to the end pieces by first and second coupling pieces having externally threaded ends which are engageable with the internal threads of the first and second end pieces, and engageable with the internal threads of the center piece, by threadingly engaging one each of said coupling pieces between said center piece and an end piece. The resulting interthreaded joints are subjected to magneforming to cause the interfitting threads to deform into a permanent interference fit. The threads subjected to magneforming are preferably tip relieved to preclude contact of the mating parts in the root/tip area; the magneforming causing the thread material to flow radially inward, slightly flattening the individual threads and squeezing them together tip to root, to provide a high axial and radial pre-load in the joint.

BRIEF DESCRIPTION OF DRAWINGS

The invention is diagrammatically illustrated, by way of example, in the drawings appended hereto, in which:

FIG. 1 is a longitudinal cross-sectional view through a push-pull rod assembly incorporating threaded joints in accordance with the invention;

FIG. 2 is a plan view of the assembly of FIG. 1, which is rotated 90° from the assembly orientation in FIG. 1;

DESCRIPTION OF PREFERRED EMBODIMENT

Figure 3:
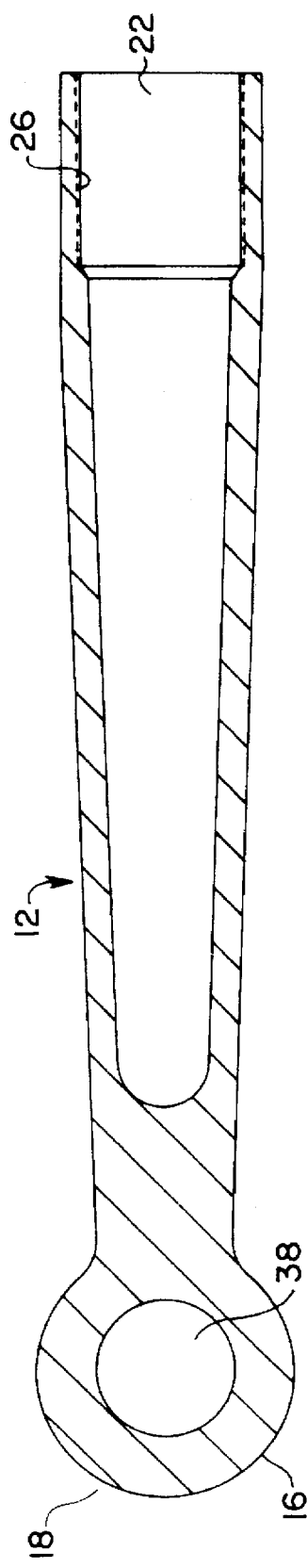
FIG. 3 is an enlarged longitudinal cross-sectional view, similar to FIG. 1, showing an end piece of the assembly in greater detail.
Figure 4:
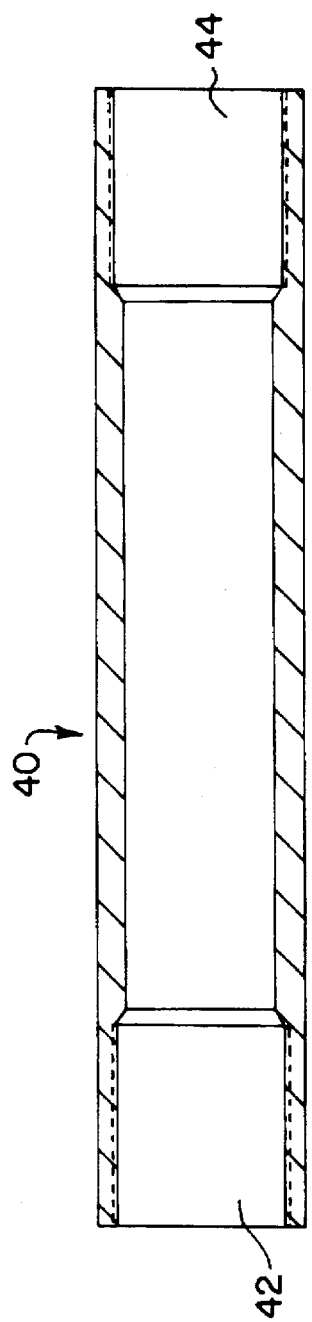
FIG. 4 is an enlarged longitudinal cross-sectional view, similar to FIG. 1, showing the center piece of the assembly in greater detail.
Figure 5:
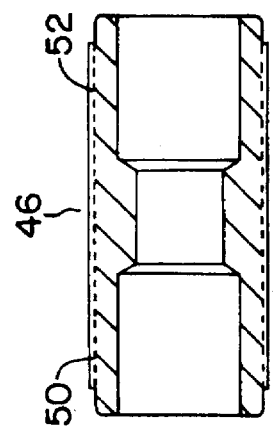
FIG. 5 is an enlarged longitudinal cross-sectional view, similar to FIG. 1, showing a coupling piece of the assembly in greater detail.

In FIGS. 1 and 2 a push-pull rod assembly 10 is shown which is typically utilized to connect components forming part of a power transmitting linkage or the like. FIGS. 1 and 2 should be viewed simultaneously with FIGS. 3, 4, and 5, which show the components of assembly 10 on an enlarged scale. Assembly 10 is formed of a metal such as aluminum or steel which is a relatively good electrical conductor, which renders such material readily amenable to electromagnetic forming. Metals displaying lesser conductivities such as titanium alloys and certain stainless steels can also be used with use, if necessary, of driving rings during the magneforming. Assembly 10 comprises first and second end pieces 12 and 14, each terminating in a connector means 16 at the distal ends 18 and 20 thereof, with the opposed ends 22 and 24 being open and internally threaded at 26 and 28. Connector means 16 may take the form of an eye 38, which enables ready connection to components to be linked by the assembly, which can e.g. be via clevis connectors or the like. A hollow center piece 40 having open internally threaded ends 42 and 44 is connected to the end pieces 12 and 14 by first and second coupling pieces 46 and 48, each having externally threaded ends 50 and 52 which threadingly engage with the internally threaded ends 22 and 24 of the first and second end pieces and the internally threaded ends 42 and 44 of the center piece. As seen in FIG. 5, the threaded ends 50 and 52 can be defined at the extremities of a continuous thread extending axially along the bulk of the coupling piece length.

Pursuant to the invention, the interthreaded joints respectively present at 54, 56, 58, and 60, following normal interthreading, are subjected to a magneforming operation which deforms each of the threaded joints into a permanent interference fit. The magneforming operation is per se one well known in the art of metal deformation. See, for example, U.S. Pat. No. 2,976,907. In such procedure—also known as magnetic pulse forming—the metal is formed by the direct application of an intense, transient magnetic field which is generated by a pulse of electric current passed through a forming coil. The resulting eddy currents induced in a conductive work piece interact with the magnetic field to cause mutual repulsion between the work piece and the forming coil. This accelerates the work piece with enough stored energy to stress the work metal beyond its yield strength. The reaction to this shaping force is sustained by the forming coil. In some instances, and as is known in the art, a field shaper, which is a relatively massive conductor which controls the field pattern, can be used to concentrate the force in selected regions of the work piece.

As also known in the art, an aluminum or other driving ring may be employed during magneforming to decrease the amount of energy required to form a joint. Such are often used to form materials with a high ratio of strength to conductivity. During the forming process the kinetic energy of the easily formed driving ring drives the tube on to the fitting. The driving ring may be left on or cut off depending on envelope and costs. A driving ring is often used to reduce the energy level required for a joint to bring it within the capabilities of the magneforming machine. It may also be employed to decrease the required energy in order to increase tool (field shaper) life.

Figure 6:
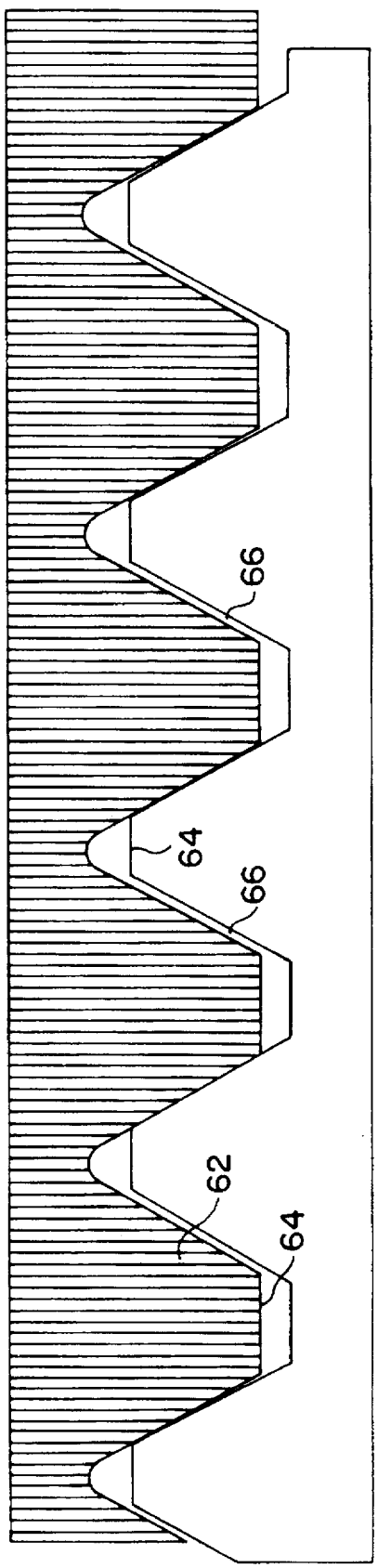
FIG. 6 is a schematic cross-section of a portion of the threads in the joints of the assembly of FIG. 1, prior to the said joint being subjected to the magneforming operation.
Figure 7:
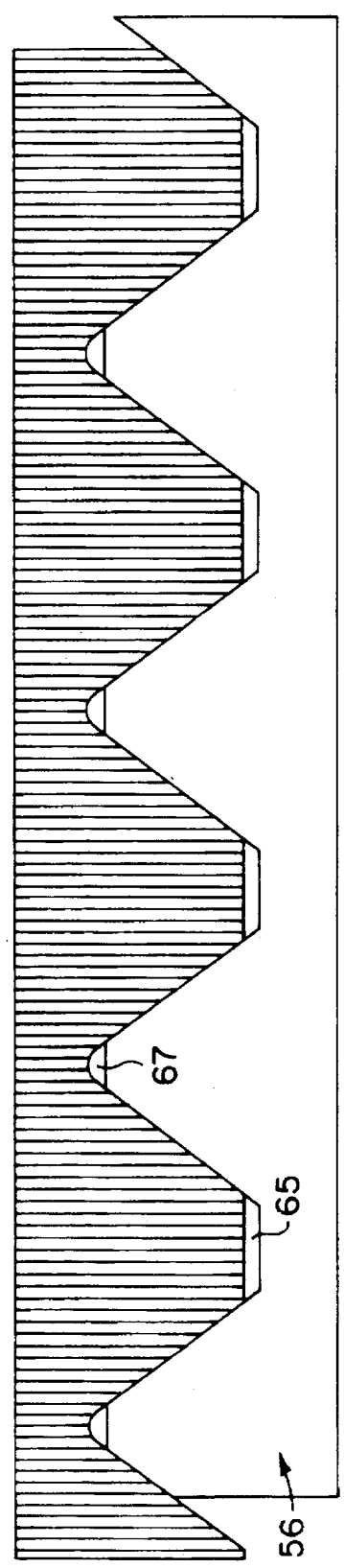
FIG. 7 is a schematic cross-sectional view of the same threads shown in FIG. 3, subsequent to the joint being subjected to the magneforming operation.

A better understanding of the effects of the magneforming may be gained from consideration of the enlarged schematic cross-sectional views of FIGS. 6 and 7 These can be considered to depict one of the joints 56 of the prior Figures. The modified thread joint formed in accordance with the invention is the merger of a modified unified thread form and the magneform cold forming process to produce a high integrity threaded joint. The magneformed joint 56 in FIG. 7 thus uses a unified standard thread with a truncated minor diameter. The magneforming process applies a uniform pressure about the outside of the thread joint shown in FIG. 6 which is sufficient to cause the outer material 62 to yield. The extreme velocity and force of the process results in the interference fit thread joint 56 of FIG. 4. The magneforming process causes the thread material to flow inward radially. This causes the section to get thicker and slightly longer. The effect on the threads, as seen in FIG. 7, is to slightly flatten the individual threads and squeeze them together tip to root leaving a high axial and radial pre-load in the joint. Note in FIG. 7 the elimination of the gap 66 of FIG. 6.

In order to assure axial preload of the joint, the threads are preferably tip relieved as at 64. This tip relief precludes contact of the mating parts in the tip/root areas 65 and 67. This results in a uniform preloaded contact about the pitch diameter of the thread. Various additional thread form modifications (or combinations of modifications) may be incorporated to optimize the joint for a variety of applications. Some typical modifications include (but are not limited to) changes to the root fillet, thread angle and the addition of axial slots or grooves for additional torque capacity.

While the present invention has been set forth in terms of specific embodiments thereof, it will be understood in view of the instant disclosure, that numerous variations upon the invention are now enabled to those skilled in the art, which variations yet reside within the scope of the present teaching. Accordingly the invention is to be broadly construed and limited only by the scope and spirit of the claims now appended hereto.

What is claimed is:

1. A threaded joint assembly comprising:
   a first metallic work piece having an internally threaded cylindrical opening;
   a second metallic work piece having an externally threaded cylindrical surface threadingly engaged with the internally threaded opening of said first work piece; and
   the interthreaded joint between said first and second work pieces being electromagnetically deformed into a permanent interference fit, individual threads at said joint being slightly flattened and squeezed together tip to root to provide a high axial and radial pre-load in the joint.

2. An assembly in accordance with claim 1, wherein at least portions of said first and second work pieces defining said interthreaded joint are hollow cylinders.

3. A method for forming a threaded joint assembly, comprising:
   providing a first metallic work piece having an internally threaded cylindrical opening;
   providing a second metallic work piece having an externally threaded cylindrical surface;
   threadingly engaging the externally threaded cylindrical surface of said second work piece with the internally threaded opening of said first work piece; and
   subjecting the resulting interthreaded joint to magneforming to cause the interfitting threads to deform into a permanent interference fit; at least portions of said first and second work pieces defining said joint being hollow cylinders; and the threads subjected to said magneforming being tip relieved to preclude contact of the mating parts in a root/tip area; the magneforming causing the thread material to flow radially inward, slightly flattening the individual threads and squeezing them together tip to root, to provide a high axial and radial pre-load in the joint.

4. A push-pull rod assembly comprising:

first and second metallic end pieces, each terminating in a connector means at the distal end thereof, with the opposed ends being open and internally threaded;

a hollow metallic center piece having open internally threaded ends;

first and second metallic coupling pieces, each having externally threaded ends engageable with the internally threaded ends of said first and second end pieces and of said center piece; one each of said coupling pieces being threadingly engaged between an end of the said center piece and an opposed open end of one of said first and second end pieces; and the interthreaded joints between said coupling pieces and the thereby coupled center and end pieces being electromagnetically deformed into a permanent interference fit.

5. An assembly in accordance with claim 4, wherein individual threads at said joints are slightly flattened and squeezed together tip to root to provide a high axial and radial pre-load in the joint.

6. A method for forming a push-pull rod assembly, comprising:

providing first and second metallic end pieces, each having a distal connector means and an opposed internally threaded open end;

providing a hollow metallic center piece having opposed internally threaded open ends;

coupling said hollow center piece to said end pieces by first and second metallic coupling pieces having externally threaded ends which are engageable with the internally threaded ends of said first and second end pieces, and engageable with the internally threaded ends of said center piece, by threadingly engaging one each of said coupling pieces between said center piece and one of the end pieces; and subjecting the resulting interthreaded joints to magneforming to cause the interfitting threads to deform into a permanent interference fit.

7. A method in accordance with claim 6, wherein the threads subjected to magneforming are tip relieved to preclude contact of the mating parts in a root/tip area; the magneforming causing the thread material to flow radially inward, slightly flattening the individual threads and squeezing them together tip to root, to provide a high axial and radial pre-load in the joint.

* * * * *